July 11, 1933.     A. F. ARCIER ET AL     1,918,079
AIRCRAFT
Filed June 17, 1931
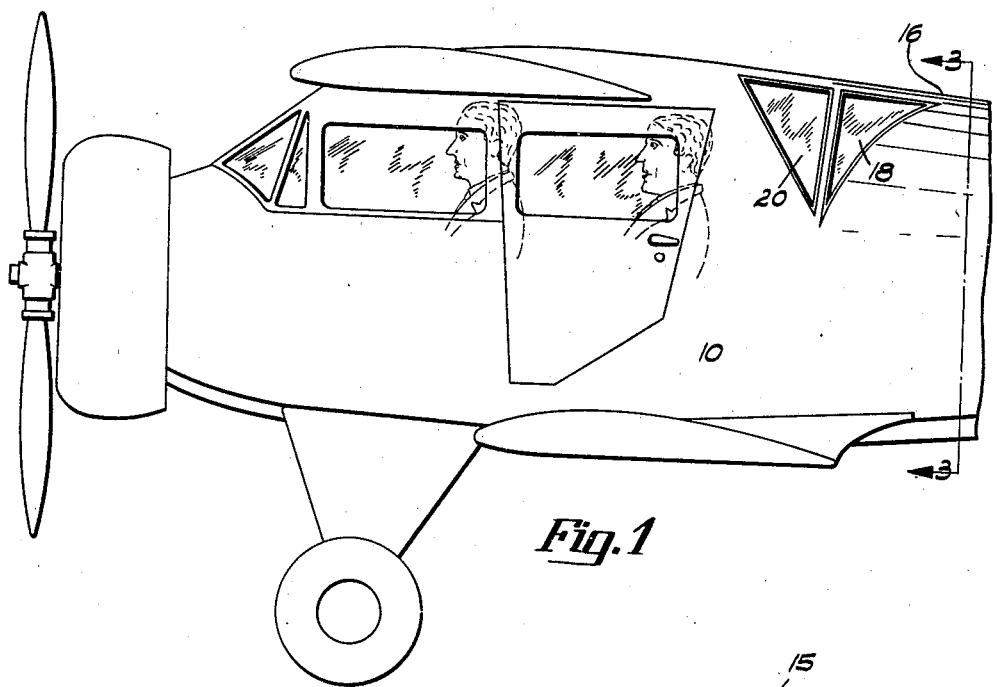
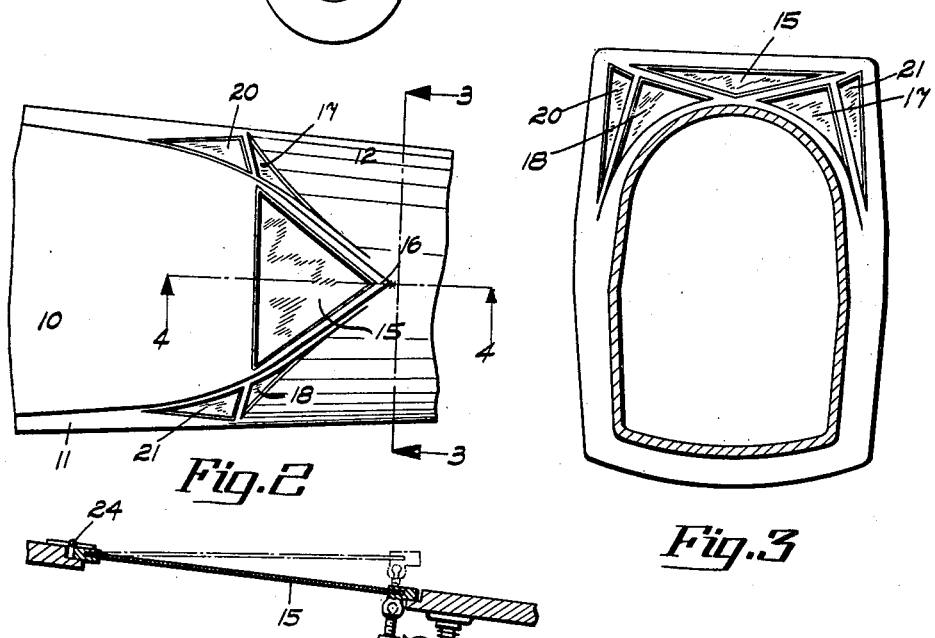
Inventor
A. F. Arcier
R. W. Gibson
By
Maréchal & Noé
Attorney Patented July 11, 1933

1,918,079

UNITED STATES PATENT OFFICE

ALEX FRANCIS ARCIER, OF DAYTON, AND REGINALD W. GIBSON, OF TROY, OHIO, ASSIGNORS TO THE WACO AIRCRAFT COMPANY, OF TROY, OHIO, A CORPORATION OF OHIO

AIRCRAFT

Application filed June 17, 1931. Serial No. 544,942.

This invention relates to aircraft and more particularly to airplanes of the cabin type.

One object of the invention is the provision of an aircraft of the cabin type, having windows arranged at the upper rear portions of the cabin providing for visibility of the cabin occupant in a rearward and upward direction.

Another object of the invention is the provision of a window arrangement for cabin airplanes, in which a top window and a plurality of side windows are provided at the upper rear portion of the cabin, forming a generally streamline shape and streamlining the upper rear portions of the cabin into the rounded tail portion of the fuselage.

Other objects and advantages of the invention will be apparent from the following description, the appended claims and the accompanying drawing, in which—

Fig. 1 is a side elevation of the front portion of an airplane embodying the present invention;

Fig. 2 is a top plan view of the rear portion of the cabin, showing the window arrangement;

Fig. 3 is a transverse section through the rear portion of the fuselage on the line 3—3 of Fig. 1, looking in a forward direction; and Fig. 4 is a section on the line 4—4 of Fig. 2 showing a detail of the window fastening.

Referring more particularly to the drawing in which like reference numerals refer to similar parts in the various views, 10 designates generally an airplane fuselage having a forward cabin portion 11, extending from which is the tapering tail portion 12. The tail portion is rounded on its upper side as indicated in Fig. 3, its height being about equal to the height of the cabin. The cabin is generally rectangular in shape so that the top side portions extend out beyond the tail portion 12.

Where the rear part of the cabin is joined to the forward top part of the tail portion 12 there are windows providing for rearward visibility of the occupant or occupants. These windows are so arranged as to form an approximately streamlined shape and terminate in a point at the top of the rear or tail portion 12, to reduce the resistance of the fuselage and at the same time provide good visibility to the rear and in an upward direction. This is a very desirable feature when preparing to take off from a crowded airport.

The window arrangement comprises a top window 15 lying substantially in a horizontal geometric plane and provided above and to the rear of the occupant's position in the cabin. This window, as shown, is substantially triangular in shape, and extends to a point 16 contained in the curved top of the rear fuselage portion 12. Rearwardly converging side windows 17 and 18 are provided at the rear upper corners of the cabin so as to extend rearwardly to the point 16 referred to, these windows being inclined upwardly and converging rearwardly and conforming at their lower edges to the curved shape of the fuselage portion 12. In front of the windows 17 and 18 are the side windows 20 and 21 which lie in downwardly diverging geometric planes and which form the outer upper walls of the cabin.

The side windows 17, 18, 20 and 21 provide good visibility in a lateral and rearward direction throughout a considerable arc and at an appreciable downward angle. Visibility is obtained directly to the rear through the windows 17 and 18, while the top window 15 permits the occupants to look directly upwardly and rearwardly so that they can readily see another airplane approaching from the rear when taking off from a crowded airport. These windows almost entirely eliminate the blind spots that are such an undesirable feature of the orthodox cabin airplane. However, the window arrangement herein described provides visibility for the occupants without unduly spoiling the good streamline shape of the fuselage.

The top triangular window 15 is preferably arranged so as to open and provide an emergency exit for the occupants should the airplane alight on water, in which case the normal door at the side of the cabin would almost certainly be submerged. The airplane floats nose downward on the water due to the weight of the motor so that the only portion above the water level would be the rear part of the fuselage which would project up at an angle of about 45°. It is in this part of the fuselage that the triangular window 15 is situated. This window is therefore preferably hinged along an axis 24, extending transversely along its forward edge, while the rear corner of the window is operatively connected to a threaded screw 25 adapted to be operated by a handwheel 26. The screw 25 is threaded in a nut 27 fixed to a suitable socket piece 28 that is held by springs 29 in some suitable fixed position. The handle 26 may be turned so as to raise and lower the rear of the window so that it may serve as a suction ventilator for the cabin. There is a region of lowered atmospheric pressure at this part of the fuselage, while the craft is in flight, and a comparatively small opening at this location rapidly exhausts the air inside of the cabin, the air being replaced by fresh air through one of the forward windows. However, the construction is such that the handwheel 26 may be grasped and pulled forwardly to release the socket 28 from the spring holders 29 and permits the window to be swung wide open in a very ready manner to provide an exit in case of any emergency. While one form of window operating device is herein shown, it will be obvious that any other suitable control or operating mechanism may be employed.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a cabin, a transversely curved rear fuselage portion extending from said cabin, a window arranged in the central top portion of the cabin providing for visibility of the occupant in a rearward and upward direction, and windows provided in the upper outer rear corners of the cabin providing for visibility directly to the rear and also in an outward and rearward direction.

2. In an aircraft, a cabin, and a tail fuselage portion extending rearwardly from said cabin, said fuselage portion having a transversely curved upper surface, a triangular top window at the rear of the cabin, side windows arranged so as to merge the cabin into the upper portion of the tail fuselage portion, and additional side windows providing for visibility in a rearward and outward and in a rearward and downward direction.

3. In an aircraft, a cabin, and windows extending at substantial angles to the path of air flow in the regions adjacent thereto and arranged at upper rear side portions of the cabin so as to provide for rearwardly upward and lateral visibility from the pilot's cockpit, and a fuselage tail extending rearwardly from the cabin, the top of the tail and the top of the cabin in the central vertical plane of the fuselage forming smoothly curved streamline continuations of one another and the sides of the cabin and of the tail in the horizontal central plane of the fuselage forming smoothly curved streamline continuations of one another.

In testimony whereof we hereto affix our signatures.

ALEX FRANCIS ARCIER.
REGINALD W. GIBSON.